(12) United States Patent
Borsuk et al.

(10) Patent No.: US 8,189,239 B2
(45) Date of Patent: May 29, 2012

(54) MEDIA OUTPUT OPTION LIGHTING SYSTEM

(75) Inventors: John E. Borsuk, Nicholasville, KY (US); Allen W. Waugerman, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1135 days.

(21) Appl. No.: 11/958,497

(22) Filed: Dec. 18, 2007

(65) Prior Publication Data

US 2009/0153916 A1    Jun. 18, 2009

(51) Int. Cl.
*H04N 1/04* (2006.01)
(52) U.S. Cl. ......... 358/474; 358/475; 358/496; 358/497
(58) Field of Classification Search .................. 358/474, 358/475, 496, 497, 498
See application file for complete search history.

(56) References Cited

U.S. PATENT DOCUMENTS

2009/0207018 A1 *  8/2009  Penke et al. .................. 340/540

FOREIGN PATENT DOCUMENTS

JP         06-191128    *  7/1994

* cited by examiner

*Primary Examiner* — Houshang Safaipour

(57) ABSTRACT

An electrophotographic device includes a scanning unit, at least one media output option for receiving a media sheet, and at least one light source for emitting a light beam to at least partially illuminate a media sheet receiving portion of the at least one media output tray. The media output tray is vertically stacked below the scanning unit. Still further, a user alert display is provided to alert a user to the presence of a media sheet in the output tray. A sensor detects a media sheet received in the output tray, and activates the light source and optionally the user alert display. The media output option may include a plurality of output trays, each output tray having a dedicated light source, user alert display, and sensor.

7 Claims, 5 Drawing Sheets

MEDIA OUTPUT OPTION LIGHTING SYSTEM

FIELD OF THE INVENTION

Electrophotographic devices such as printers, multi-function printers (MFP's), all-in-one printers, copy machines, scanners, and the like are provided, including one or more media output option choices. Particularly, such devices are provided having a media output option lighting feature, and optionally a user alert display for alerting a user to delivery of a media sheet to the media output option.

BACKGROUND OF THE INVENTION

Electrophotographic devices such as printers, scanners, copy machines, facsimile machines, and the like typically include a variety of components, including at least a scanning unit for imaging a document to be copied or scanned. A control panel, the appearance and design of which varies widely from device to device, may also be provided to allow a user to input the desired commands to the device. Such devices typically include also one or more photoconductive members, such as a photoconductive drum or belt, which may be charged to a substantially uniform potential for transfer of a latent image thereto.

In general terms, a conventional electrophotographic device scanning unit exposes the photoconductive member to a light image of a document, drawing, or other image to be transferred to media, providing an electrostatic latent image of the document. The latent image is then developed by applying a developer such as a dry, granular toner, although a liquid developer may also be employed. The toner electrostatically adheres to the latent image, and is then transferred to a media sheet passed thereover. The toner may then be fused to the media sheet by application of heat. Of course, toner of one or more colors may be used, in accordance with the user's preference for a black-and-white only image or a color image.

As is well known in the art, electrophotographic devices may include also one or more media output options to which media sheets bearing a copied or scanned image are output for retrieval by a user. Media output options may be as simple as a single tray or bin to which a media sheet is output, or may be more sophisticated options for presenting a finished product, that is one or more media sheets containing copied images. A non-limiting list of examples of such media output options may include a multi-bin "mailbox" or sorter output option, which segregates individual collated copies of a copied or scanned multi-page document in separate trays or bins after a copying or scanning action. Similarly, offset stacker output options are known, wherein collated media sheets forming multiple copies of a particular multi-page document are delivered to and vertically stacked in a single tray without fastening or segregating in different bins or trays, but wherein each copy of the multi-page document is slightly offset from both the preceding and the following copy for ease of retrieval. Similarly, it is known to provide an automated fastener output option such as an automated stapler, for fastening multiple collated media sheets forming a single multi-page document.

The scanning unit, light source, photoconductive member, and media trays are typically considered essential components of an all-in-one electrophotographic device. In other words, without at least those basic items, the electrophotographic device cannot perform its most basic function of transferring an image from one media sheet to one or more different media sheets. Accordingly, those items are typically provided internally of the electrophotographic device housing. Similarly, a source of toner or other developer is typically provided internally of the housing. That is, a particular "footprint" and external dimension are defined for the electrophotographic device. That footprint and external dimension determine the amount of horizontal and vertical space, respectively, required to accommodate the device, and the items listed above are typically positioned within that footprint and external dimension.

Typically, media output options such as those described herein are provided as "add-ons" attached to the electrophotographic device. Such output options must be included as part of the path through which a media sheet travels from imaging to developing to fusing as discussed above, and are usually the final stop or endpoint of that media path of travel prior to retrieval by a user. Because a media sheet is most commonly a physical item traveling through a defined path of travel in an electrophotographic device, rather than being transmitted as data, it is uncommon for media output options to be positioned remotely of the device. Most commonly, output options such as a mailbox, an offset stacker, and others must be physically connected to the electrophotographic device, such as to one side or to the front, to allow them to integrate into the media path of travel. Due to this conventional positioning, media output options typically extend beyond the electrophotographic device footprint and may increase the device external dimension. Undesirably, this increases the space required for the device, which space may be at a premium. Even more, this increases the size of packaging required for shipping such devices, increasing cost and labor involved in packaging and transport. It is therefore desirable to include such media output options as described herein without increasing the device footprint and/or external dimension.

One way in which this could be accomplished would be to place the media output option on a top surface of the electrophotographic device. However, most commonly a sheet feeder of known design and function is positioned vertically stacked atop a lid placed directly above the scanning unit, which limits the availability of that surface for inclusion of other devices.

Thus, often the only available space for inclusion of a media output option, without increasing the electrophotographic device footprint, is to place the option within the device body. One way to accomplish that is to place the media output option in a vertically stacked relationship under the scanning unit, but this orientation leads to an additional disadvantage in that the output option, and media sheets contained therein, are at least obscured and may be partially hidden by the scanning unit and possibly the control panel of the electrophotographic device. Even more, the shadowing effect of the overlying scanning unit/control panel may result in a print, copy, or facsimile job lying unattended after completion, due to the inability of the user to see the end product. This undesirably reduces user convenience.

Accordingly, a need is identified in the art for an electrophotographic device providing one or more media output options without increasing the device footprint and/or external dimension, but without creating the disadvantages discussed above.

SUMMARY OF THE INVENTION

The above-mentioned and other problems are solved by applying the principles and teachings associated with the presently described electrophotographic device. The present device comprises one or more media output options vertically stacked below a scanning unit. A light source is provided for at least partially illuminating a media sheet receiving portion of an output tray of the media output option. A sensor may be provided for sensing delivery of a media sheet received in the output tray, which sensor activates the light source in response to that delivery. Still further, the electrophotographic device may include a user alert display which activates in response to the delivery of a media sheet into the output tray. Media output options having multiple output trays may be provided, each of which may have a dedicated light source, user alert display, and sensor.

Even more, a method for alerting a user to the delivery of a media sheet to an output tray of a media output option is provided. The method includes sensing delivery of at least one media sheet to a media output option, and activating a light source to at least partially illuminate a media sheet receiving portion of the output option. The method may include also sensing delivery of at least one media sheet, directing a first portion of a light beam emitted from the light source to at least partially illuminate the media sheet receiving portion, and directing a second portion of the light beam in a different direction to alert the user to the presence of the media sheet.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, software, and/or other changes may be made without departing from the scope of the present invention.

Figure 1:
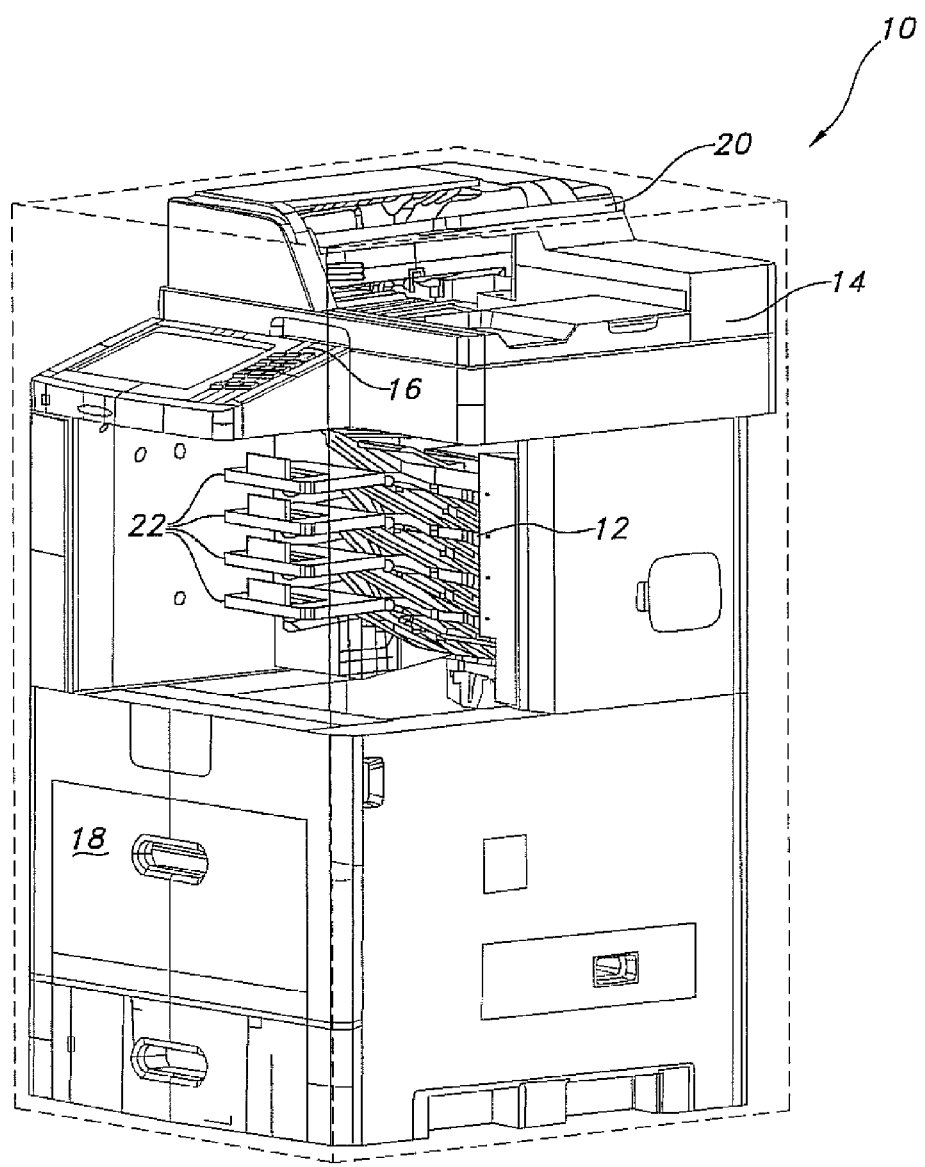
FIG. 1 shows an electrophotographic device including a media output option vertically stacked below a scanning unit.

In accordance with the foregoing identified need in the art, and with reference to FIG. 1, an electrophotographic device 10 for transferring an image to at least one media sheet is provided. That device 10 is adapted to receive therein at least one media output option 12 for receiving an imaged media sheet, including without limitation options 12 such as a mailbox sorter, an offset media stacker, and the like. In one embodiment of the device 10, the media output option 12 is installed in the device 10 without increasing a footprint and/or external dimension of the device. That device 10 footprint and external dimension may be conceptualized as an imaginary three-dimensional boundary, represented in FIG. 1 in dotted lines, beyond which no portion of the device 10 extends.

The electrophotographic device 10 includes also other features well-known in the art, such as a control panel 16 for receiving input instructions from a user, a scanning unit 14 which scans a document containing text and/or images to be copied, and at least one media tray 18 for holding one or more media sheets onto which the text and/or images are to be copied. Such media sheets may include without limitation paper, photographic paper, transparencies, and the like. A top-mounted media sheet feeder 20 is also provided in the depicted embodiment.

As shown in the figures, a media output option 12 is vertically stacked below the scanning unit 14 and the control panel 16 in order to avoid increasing the device 10 footprint and/or external dimension. That media output option 12 may include one or more output trays 22 having media sheet receiving portions 24 to which a media sheet is delivered. As discussed above, such media output options 12 may be as simple as a single output tray 22, or may include multi-tray options such as, without limitation, a mailbox sorter, an offset media stacker, and the like.

Figure 2:
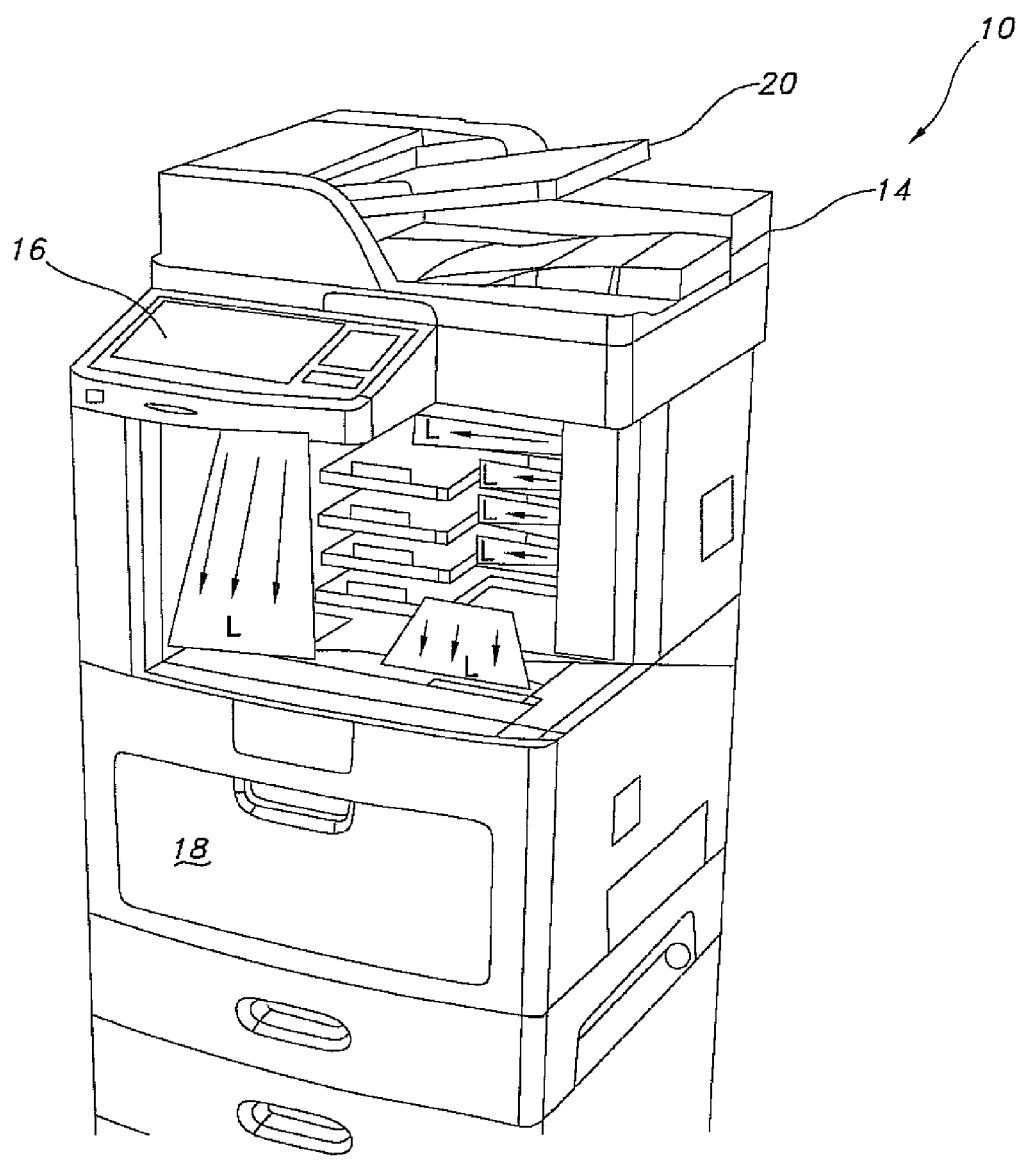
FIG. 2 shows one embodiment of the device of FIG. 1 in use.
Figure 3:
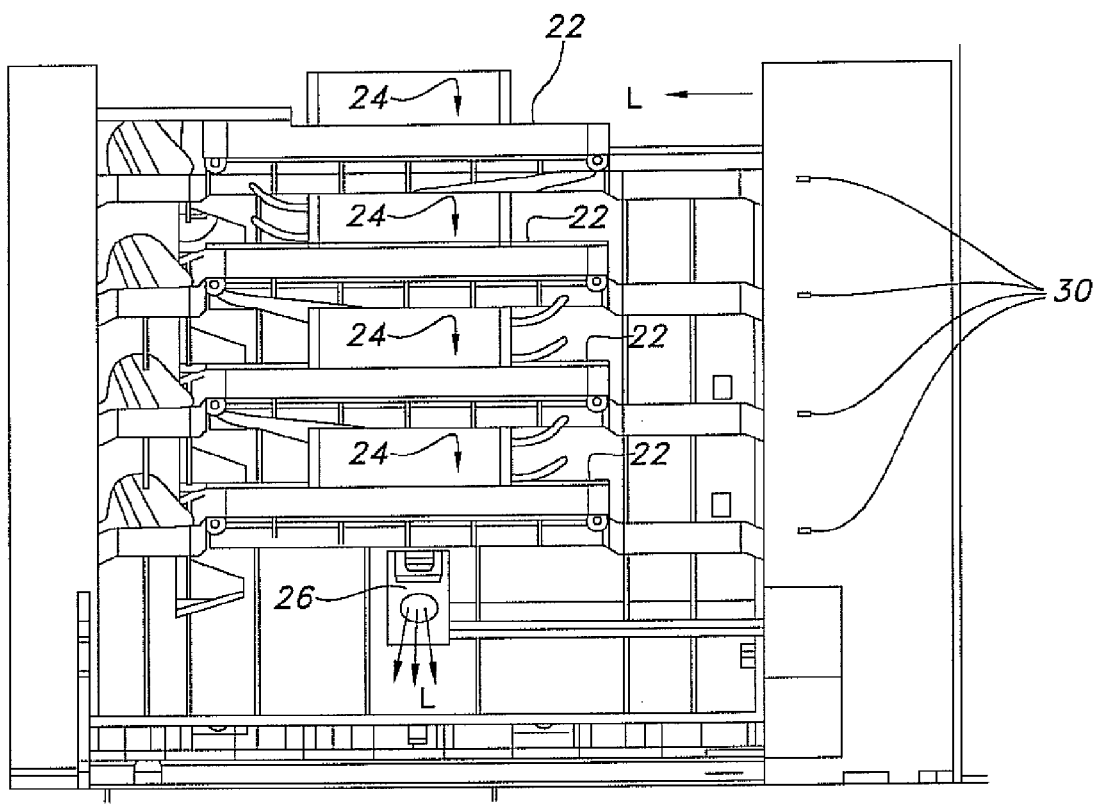
FIG. 3 is a front view of a media output option having a plurality of output trays, each having a light source and a user alert display.
Figure 4:
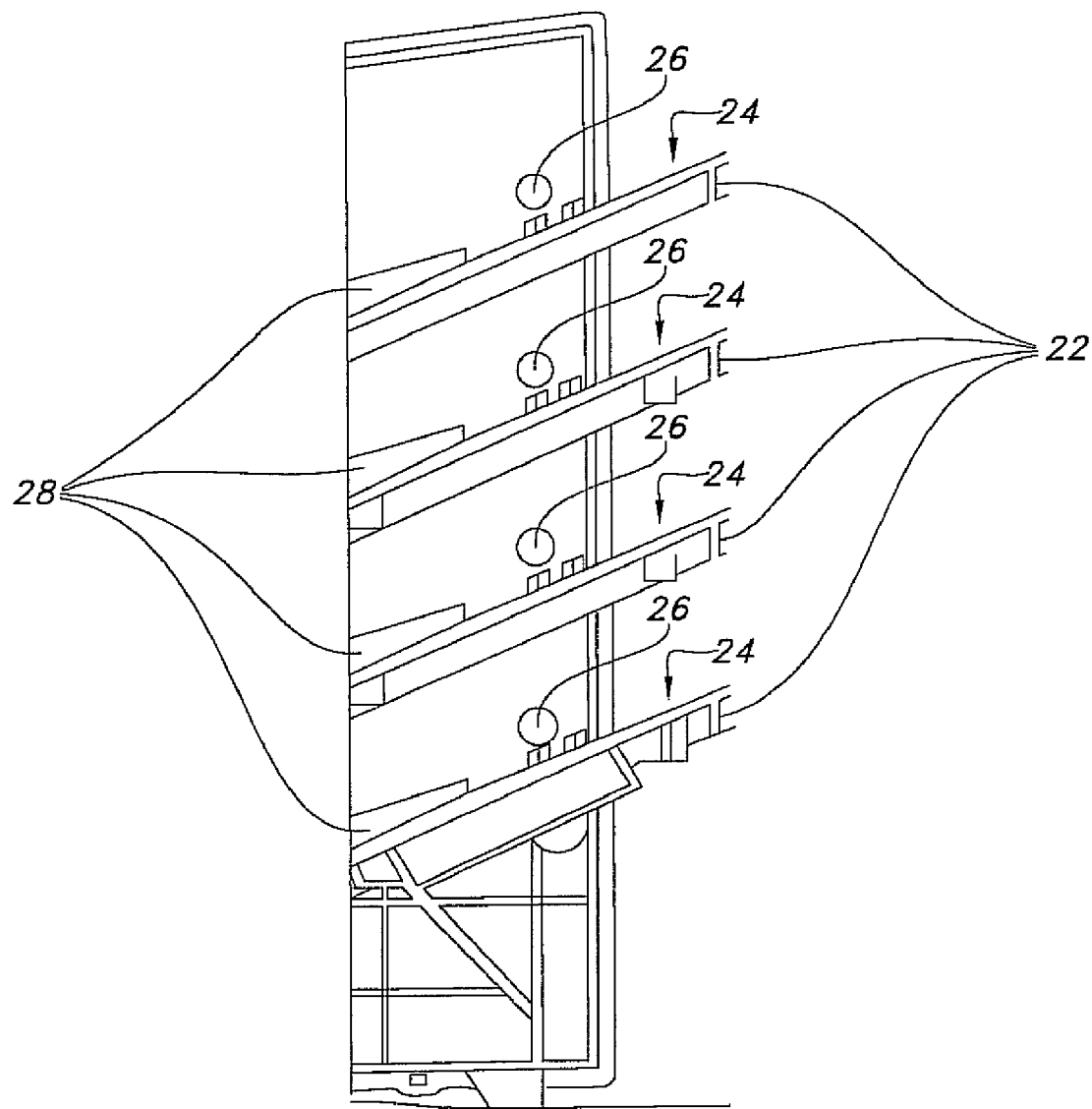
FIG. 4 shows a side view of the media output option of FIG. 3.

In this configuration, at least a portion of the media output option 12, and in particular the media sheet receiving portion 24 of the output tray 22, may be shadowed and/or obscured from a user's vantage point. With reference to FIGS. 2-4, to solve this problem at least one light source 26 is provided, for emitting a light beam (represented as arrows L) to at least partially illuminate the media sheet receiving portion 24 of the at least one media output tray 22. It will be appreciated that a single light source 26 may be provided to at least partially illuminate one or more media sheet receiving portions 24, or alternatively a plurality of light sources 26 may be provided, each respectively dedicated to at least partially illuminating a specific media sheet receiving portion 24.

Any suitable light source 26 is contemplated for use in the device 10, including without limitation such sources as a light emitting diode, an incandescent lamp, a laser, a halogen lamp, a gas discharge lamp, and a high intensity discharge lamp. In one embodiment, the light source 26 is a light emitting diode, selected for the advantageous feature of relatively small size and minimal power requirements, without loss of viewability.

Still further (see FIG. 4), at least one sensor 28 for sensing at least one media sheet (not shown for convenience) received in the at least one media output option 12 may be provided, wherein the at least one sensor 28 activates the at least one light source 26 in response to receipt of a media sheet in the media sheet receiving portion 24. The sensor 28 may be a simple switch or lever which is displaced by the delivery of a media sheet to the media sheet receiving portion 24, thereby opening or closing a circuit and activating the light source 26 (see especially FIG. 4). Of course, any suitable mechanism may be employed for sensor 28, including without limitation an optical transmitter-receiver assembly, a pressure switch, a weight sensor, or the like (embodiments not shown). Of course, the type of sensor selected will dictate the placement of that sensor in, on, or near the media output option 12.

Optionally, at least one user alert display 30 for alerting a user to the presence of the at least one media sheet received in the at least one media output option 12 may be provided. With reference to FIGS. 3-4, in the depicted embodiment a user alert display 30 is provided adjacent to each output tray 22. Thus, in the depicted embodiment, delivery of a media sheet to the media sheet receiving portion 24 will activate the light source 26, but also the user alert display 30, alerting the user to the presence of the media sheet. The sensor 28 may be operatively connected also to the user alert display 30, whereby delivery of a media sheet to the media sheet receiving portion 24 activates the light source 26 and concurrently activates the user alert display 30. As shown and described herein, activation of a light is contemplated for use as user alert display 30. The user alert display 30 may emit light continuously, or may flash or activate intermittently. Still further, user alert display 30 may be adapted to function for only a predetermined time period after activation, or may de-activate only upon removal of the media sheet from the media sheet receiving portion 24. Even further, it will be appreciated that alternative user alert displays 30 may be provided alone or in combination, such as a light, a sound, transmission of a digital signal to a remote user workstation, and the like.

In the embodiment of the device 10 shown and described herein, an electrophotographic device 10 is provided having a media output option 12 including multiple output trays 22. Further, multiple light sources 26, sensors 28, and user alert displays 30 are provided, wherein each light source 26, sensor 28, and user alert display 30 is dedicated to a specific output tray 22. That is, in the depicted embodiment, each output tray 22 includes a sensor 28, which activates a light source 26 to at least partially illuminate a media sheet receiving portion 24 of output tray 22 and also activates a separate user alert display 30 tied to that specific output tray 22. However, the skilled artisan will readily appreciate that a single light source 26 for at least partially illuminating one or more output trays 22, as well as a single user alert display 30 for alerting the user to the presence of a media sheet in one or more output trays 22 is also contemplated. As an example (not shown), each output tray 22 may include a separate sensor 28, with each sensor 28 operatively connected to a single light source 26 and user alert display 30.

Still further, in another aspect a method is provided for alerting a user to the presence of a media sheet delivered to a media output option 12 of an electrophotographic device 10. This method includes the steps of sensing delivery of at least one media sheet to at least one media output option 12 and activating at least one light source 26 to emit a light beam in response to sensing delivery of the at least one media sheet. The light source 26 then at least partially illuminates a media sheet receiving portion 24 of the at least one media output option 12. Optionally, a user alert display 30 may be concomitantly activated. As described above, one or more light sources 26 and user alert displays 30 may be provided, according to the number of media sheet receiving portions 24 contained in the media output option 12. That is, a single light source 26 and user alert display 30 may be provided for a device 10 having a single output tray 22. Alternatively, a single light source 26 and user alert display 30 may be provided for a device 10 having multiple output trays 22. Still further, multiple light sources 26 and user alert displays 30 may be provided, each dedicated to a specific output tray 22 of a media output option 12 having multiple output trays 22.

It is of course contemplated to provide entirely separate light sources 26 and user alert displays 30. However, often space for inclusion of such structures is at a premium in an electrophotographic device 10 of the type described herein. That is, only a limited amount of space exists for inclusion of the various essential and optional features typically provided in an electrophotographic device 10 of this nature. To address this problem, in one embodiment of the invention a combined light source 26/user alert display 30, and also a method for illuminating a media output option 12 and for alerting a user to the presence of a media sheet therein, are provided. Thus, in another aspect of the present method there is contemplated directing a first portion of a spread beam pattern of a light beam emitted from a light source 26 substantially in a first direction to at least partially illuminate the media sheet receiving portion 24, and directing a second portion of the spread beam pattern of the emitted light beam substantially in a second, different direction to function as a user alert display 39.

Figure 5:
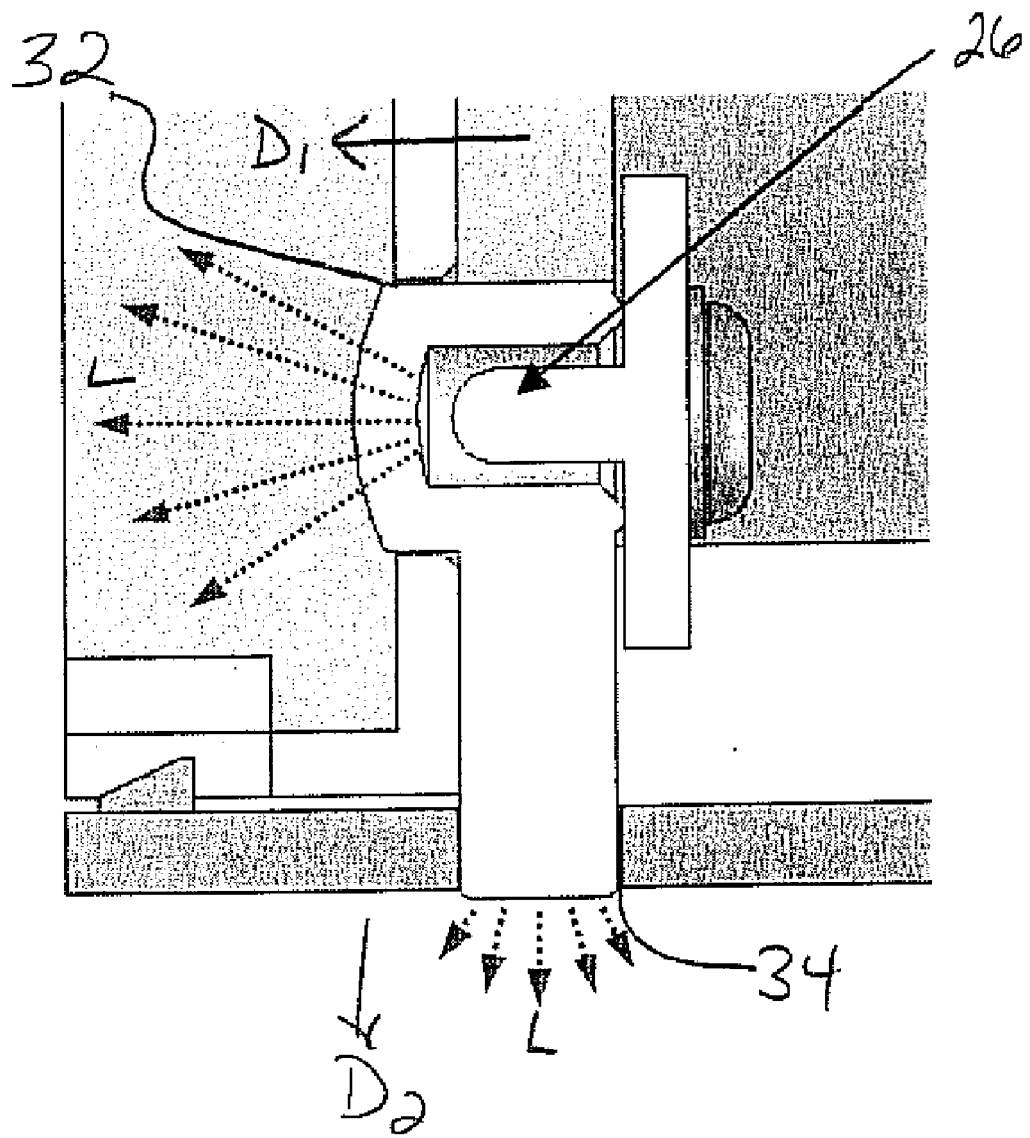
FIG. 5 shows a combined light source and user alert display.

With reference to FIG. 5, one possible structure contemplated for accomplishing this method is depicted. A light source 26 is provided, which as discussed above may be any suitable light source such as a light emitting diode, a halogen light, a laser, etc. A first light exit 32 is provided, which allows light beams to travel in a first direction $D_1$ to at least partially illuminate a portion of a media output option 12 as discussed above. In addition, a second light exit 34 is provided, allowing light beams to travel in a second direction $D_1$ that is different from the first direction $D_1$, to serve as a user alert display 30. Of course, rather than a light source 26 held in proximity to light exits 32, 34, alternative structures are contemplated, such as reflectors, light pipes, or similar structures for directing light beams in one or more desired paths.

Accordingly, an electrophotographic device 10 including one or more media output options 12 is described herein. In particular, an electrophotographic device 10 having one or more media output options 12 vertically stacked below a scanning unit 14 is shown and described, which reduces the device 10 footprint and/or external dimension. The device 10 described herein further includes a light source for at least partially illuminating a media sheet receiving portion of the media output option 12, overcoming the shadowing or obscuring effect of placing the media output option 12 in this configuration. Further, one or more user alert displays 30 are included, to more efficiently alert a user to the presence of a media sheet in the output option 12.

One of ordinary skill in the art will recognize that additional embodiments of the invention are also possible without departing from the teachings herein. This detailed description, and particularly the specific details of the exemplary embodiments, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. An electrophotographic device for transferring an image to at least one media sheet, comprising;
   at least one media output option for receiving an imaged media sheet;
   at least one light source for emitting a light beam to at least partially illuminate a media sheet receiving portion of the at least one media output option; and
   at least one sensor for sensing at least one media sheet received in the at least one media output option, wherein the at least one sensor senses the at least one media sheet and activates the at least one light source;
   wherein a first portion of the emitted light beam is directed in a first direction to at least partially illuminate the media sheet receiving portion of the at least one media output option, and a second portion of the emitted light beam is directed in a second direction different from the first direction to provide at least one user alert display for alerting a user to the presence of the at least one media sheet received in the at least one media output option.

2. The device of claim 1, wherein the at least one media output option includes a plurality of output trays, the at least one light source includes a plurality of light sources, each light source corresponding to a distinct output tray and emitting a light beam in a first direction to at least partly illuminate a media sheet receiving portion of a corresponding output tray and in a second direction to provide a distinct user alert display.

3. The device of claim 2, wherein the at least one sensor comprises a plurality of sensors, each sensor corresponding to a distinct output tray for sensing at least one media sheet received in a media sheet receiving portion thereof and activating the light source corresponding to the output tray.

4. An electrophotographic device for transferring an image to at least one media sheet, comprising:
  a scanning unit;
  at least one media output option including a plurality of output trays for receiving at least one imaged media sheet, wherein the media output option is vertically stacked below the scanning unit;
  a plurality of light sources, each light source for emitting a light beam to at least partially illuminate a media sheet receiving portion of a distinct output tray, each output tray corresponding to a distinct light source; and
  a plurality of sensors, each sensor corresponding to an output tray for sensing at least one media sheet received therein, wherein each sensor senses the at least one media sheet and activates the corresponding light source;
  wherein a first portion of each emitted light beam is directed in a first direction to at least partially illuminate the media sheet receiving portion of a corresponding output tray, and in a second direction, different from the first direction, to provide a user alert display for the corresponding output tray, alerting a user to the presence of at least one imaged media sheet received therein.

5. In an electrophotographic device for transferring an image to at least one media sheet, a method for alerting a user to delivery of a media sheet to a media output option, comprising:
  sensing delivery of at least one media sheet to at least one media output option by at least one sensor;
  activating at least one light source to emit a light beam in response to sensing delivery of the at least one media sheet; and
  directing a first portion of the emitted light beam in a first direction to at least partially illuminate a media sheet receiving portion of the at least one media output option, and directing a second portion of the emitted light beam in a second, different direction to provide at least one user alert display for alerting a user to the presence of the at least one media sheet received in the at least one media output option.

6. The method of claim 5, including providing at least one media output option having a plurality of output trays.

7. The method of claim 5, wherein the at least one light source includes a plurality of light sources, the at least one media output option comprises a plurality of output trays, each output tray corresponding to a distinct light source, the sensing comprises sensing delivery of the at least one media sheet to each of the output trays, the at least one user alert display comprises a plurality thereof, each user alert display corresponding to a distinct output tray, and the directing comprises directing an emitted light beam from each light source in the first direction to at least partially illuminate the media receiving portion of a corresponding output tray and in the second direction to provide the user alert display corresponding to the output tray.

* * * * *